US008884736B1

(12) United States Patent
Gravino et al.

(10) Patent No.: US 8,884,736 B1
(45) Date of Patent: Nov. 11, 2014

(54) MULTIPLE SYSTEM AND PRESENCE-BASED CALL PROCESSING

(75) Inventors: Douglas David Gravino, Roswell, GA (US); Radhakrishnan Gopinath, Alpharetta, GA (US); Michael Lee Poffenberger, Sandy Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 355 days.

(21) Appl. No.: 13/083,807

(22) Filed: Apr. 11, 2011

Related U.S. Application Data

(63) Continuation-in-part of application No. 12/941,385, filed on Nov. 8, 2010.

(60) Provisional application No. 61/426,834, filed on Dec. 23, 2010.

(51) Int. Cl.
*G05B 19/02* (2006.01)

(52) U.S. Cl.
USPC .............. 340/4.31; 340/539.13; 340/10.4; 455/41.2; 455/456.3; 379/88.25; 379/201.03; 379/201.01; 726/14; 726/22; 726/28; 726/2

(58) Field of Classification Search
CPC ....... H04L 69/329; H04L 67/04; H04L 29/06; H04L 67/306; G06Q 10/10
USPC ............... 340/4.31, 539.13, 10.4; 379/88.25, 379/201.03, 201.01; 726/14, 22, 28, 2; 455/41.2, 456.3
See application file for complete search history.

(56) References Cited

U.S. PATENT DOCUMENTS

| | | | |
|---|---|---|---|
| 6,505,780 B1 | 1/2003 | Yassin et al. | |
| 7,227,937 B1 * | 6/2007 | Yoakum et al. | 379/201.01 |
| 7,564,346 B2 | 7/2009 | Takahashi et al. | |
| 2004/0172481 A1 * | 9/2004 | Engstrom | 709/239 |
| 2005/0097595 A1 * | 5/2005 | Lipsanen et al. | 725/25 |
| 2007/0150938 A1 * | 6/2007 | Moon et al. | 726/2 |
| 2008/0174421 A1 * | 7/2008 | Londhe | 340/539.13 |
| 2008/0240385 A1 * | 10/2008 | Mikhailov | 379/88.25 |
| 2009/0257576 A1 * | 10/2009 | Wellard et al. | 379/201.03 |
| 2010/0156608 A1 | 6/2010 | Bae et al. | |
| 2011/0145040 A1 * | 6/2011 | Zahn et al. | 705/7.33 |
| 2012/0112877 A1 | 5/2012 | Gravino et al. | |
| 2012/0182145 A1 | 7/2012 | Jameson et al. | |

OTHER PUBLICATIONS

Office Action mailed Oct. 31, 2012, in co-pending U.S. Appl. No. 12/941,385.
Office Action mailed Apr. 30, 2013, in co-pending U.S. Appl. No. 12/941,985.
Douglas David Gravino et al., U.S. Appl. No. 12/941,385, filed Nov. 8, 2010.

* cited by examiner

*Primary Examiner* — Benjamin C Lee
*Assistant Examiner* — Chico A Foxx
(74) *Attorney, Agent, or Firm* — Merchant & Gould P.C.

(57) ABSTRACT

Processing communications to and from multiple communications systems based on user preferences and based on presence information for one or more users of the communications systems is provided. A user who operates multiple communications systems may set preferences with each of the systems individually or through a centralized communications management system to control call processing to each of the systems based on prescribed user preferences and based on presence information for the user. In addition, communications applications associated with one or more communications systems may be automatically activated or functionally modified based on user preferences and/or user presence information.

21 Claims, 3 Drawing Sheets

MULTIPLE SYSTEM AND PRESENCE-BASED CALL PROCESSING

CROSS REFERENCE TO RELATED APPLICATIONS

The present application claims priority to U.S. Provisional Patent Application No. 61/426,834 filed Dec. 23, 2010, and the present application is a continuation-in-part of U.S. patent application Ser. No. 12/941,385 filed Nov. 8, 2010, titled "Automated Device/System Setup Based on Presence Information," the disclosure of both of these applications being hereby incorporated by reference in their entirety.

BACKGROUND

With the advent of modern communications systems, users often have access to and utilize multiple communications devices. For example, a given user may operate a wireline telephone at his or her home, business, school or other facility. Simultaneously, the user may operate a wireless telephone or messaging device. And, the user may have one or more of his/her communications devices/systems associated with other systems for adding additional functionality or services. For example, a user may have his/her wireline or wireless telephones associated with a television services system (e.g., a cable television services system so that, as calls are received at his/her wireless or wireline telephones, caller identification information is displayed on the user's television set as the calls are being received.) Such multiple communications systems, while useful, may also lead to problems of system overlap or basic information annoyances. For example, if a user is sitting in his/her living room watching television, the user may receive a telephone call on his/her wireless telephone that is presently situated in another room even though his wireline telephone is next to him/her in the living room. Conversely, the user may receive a call on the wireline telephone located in another room, but he/she is currently holding his/her wireless telephone. Or, a call may come in for the user's spouse who is not presently located in the home, and caller identification information for the incoming call may be displayed on the user's television causing use of a caller identification application associated with the user's television even though the intended recipient (e.g., the user's spouse) is not present to receive the information or call.

Thus, there is a need for multiple system and presence-based call processing and setup that allows users to set up call processing associated with multiple communications systems based on user preferences and user presence information. It is with respect to these and other considerations that the present invention has been made.

SUMMARY

The above and other problems are solved by processing communications to and from multiple communications systems based on user preferences and based on presence information for one or more users of the communications systems. According to embodiments, a user who operates multiple communications systems may set preferences with each of the systems individually or through a centralized communications management system to control call processing to each of the systems based on prescribed user preferences and based on presence information for the user. For example, based on user preferences and user preference information, calls directed to a user's wireless telephone may be automatically forwarded or routed to his/her wireline telephone if the user is physically located near the wireline telephone and vice versa. More particularly, such presence-based call processing may be performed on a more specific or granular basis. For example, if the user is physically located in a room having a wireline telephone, calls directed to the user's wireless telephone may be directed to his/her wireline telephone and vice versa.

Other communications applications associated with one or more communications systems may be automatically activated or functionally modified based on user preferences and/or user presence information. For example, if caller identification information for an incoming call is displayed on a user's television set, the display of the information may be suspended if the user is not physically present in the proximity of the television set. In addition to automatic call processing based on user preferences and user presence information, manual user interaction with communications systems in association with user preferences and user presence information may be enabled. For example, presence information may be utilized for enabling a user to manually select call processing for an incoming call to one or more communications devices.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
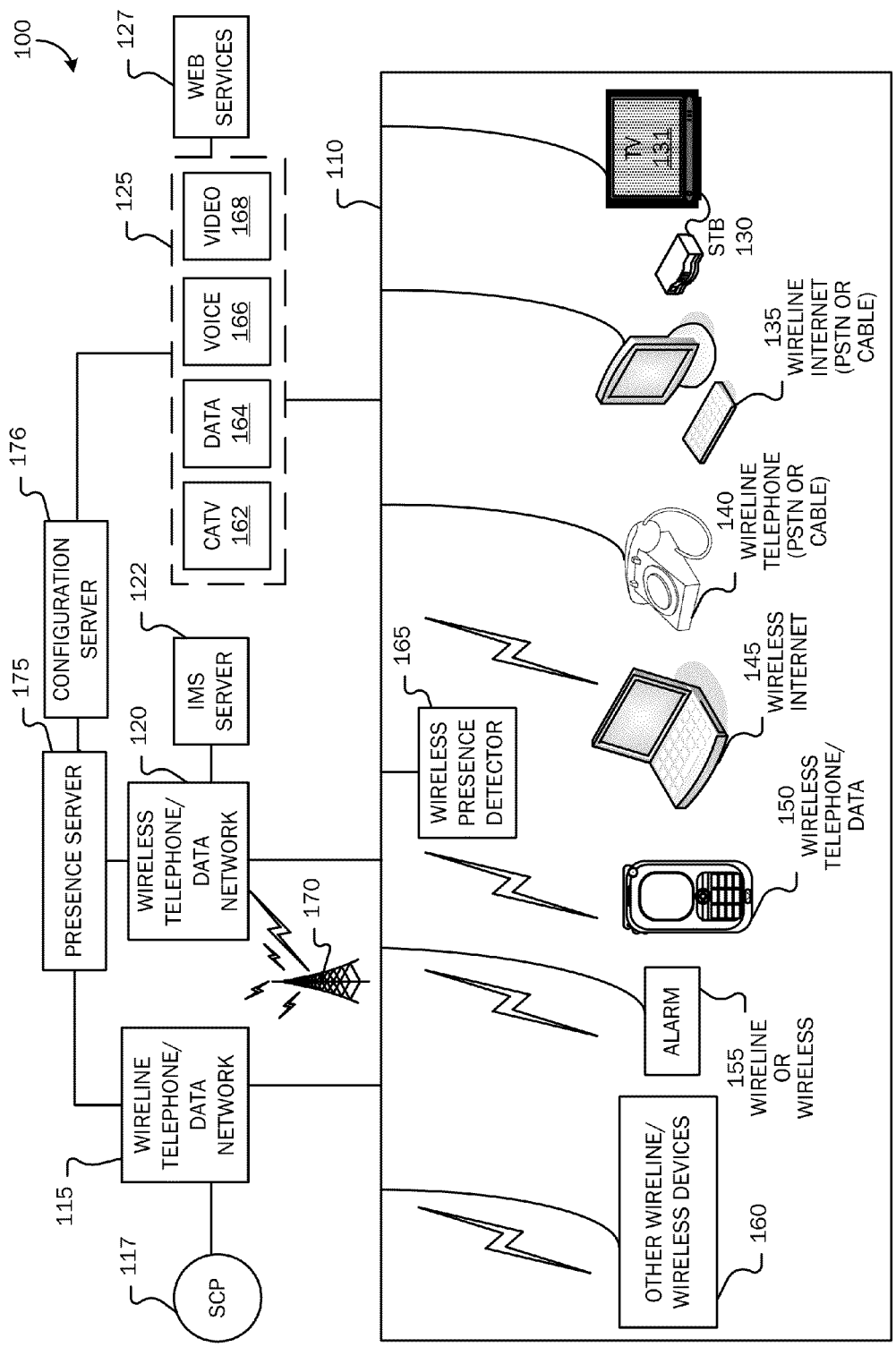
FIG. 1 illustrates a system architecture with which embodiments of the present invention may be practiced.

As briefly described above, embodiments of the present invention are directed to processing communications to and from multiple communications systems based on user preferences and based on presence information for one or more users of the communications systems. According to embodiments, a user who operates multiple communications systems may set preferences with each of the systems individually or through a centralized communications management system to control call processing to each of the systems based on prescribed user preferences and based on presence information for the user. For example, a user may set a preference with his/her wireless telephone provider that when he/she is at home, all calls should be automatically routed or forwarded to his/her home wireline system or, alternatively, the user may set a system preference that automatically routes calls directed to the user's wireline telephone to the user's wireless telephone when the user leaves the physical proximity of the user's wireline telephone. More particularly, such presence-based call processing may be performed on a more specific or granular basis. For example, if the user is physically located in a room having a wireline telephone, calls directed to the user's wireless telephone may be directed to his/her wireline telephone and vice versa.

In addition, other communications applications associated with one or more communications systems may be automatically activated or functionally modified based on user preferences and/or user presence information. For example, if a user operates a television with advanced functionality, for example, as provided by an associated computing functionality such as a cable television services system set top box or Internet-based television control or services provisioning system, calls directed to the user's wireless and/or wireline telephones may interact with the television set and associated functionality. For example, incoming calls to the user's wireless and/or wireline telephones may cause a software application associated with the user's television set to display caller identification information for the incoming calls on the user's television set. According to embodiments, based on user preferences and/or user presence information, interaction between the user's wireline and/or wireless communications systems and the user's television and associated functionality may be modified based on user preferences and/or user presence information.

According to embodiments, a given user may set preferences with his/her wireless telephone services provider and with his/her wireline telephone services provider and with the user's television services system provider and with any other of the user's voice communication system providers (e.g., VoIP, video conferencing system connected to a television or computer, video conferencing phone, etc.) that calls directed to one or more of the disparate systems are processed according to the user's preferences and to the user's presence information. For example, a user may identify a number of different callers according to their caller identification information such that incoming calls from the identified callers are processed according to specific user preferences and according to user presence information. For example, if the user is presently located away from his/her home, and a call is received from a particular incoming caller at the user's home wireline telephone system, in addition to automatically routing the incoming call to the user's wireless telephone carried by the user at a location remote from the user's home wireline telephone, caller identification information that may otherwise be displayed on the user's television set via computing functionality associated with the user's television set (e.g., via a network-connected video content viewing device such as a cable services set top box or Internet-based television functionality) may be temporarily deactivated or overridden to prevent the caller identification information from being displayed on the user's television while the user is away from home. For example, if the user's spouse, children, friends or others are presently watching a television set at the user's home, according to these embodiments, caller identification information for an incoming call directed to the user while the user is away from home may not be displayed on the user's television set given that the user is not present in the proximity of the television set. That is, setting a preference that caller identification information should not be displayed on a home-based television set when the intended recipient of the incoming call is not present in the home will avoid needlessly utilizing the caller identification application and functionality associated with the television set and will avoid needlessly annoying anyone present in the home watching the television when the incoming call is received.

In addition to automatic call processing based on user preferences and user presence information, manual user interaction with communications systems in association with user preferences and user presence information may be enabled. For example, a functionality button or control on a user's wireless telephone handset, a functionality button or control on a user's wireline telephone set, and/or a functionality button or control on a television control device, for example, a television remote control device, may be utilized for allowing the user to manually interact with communications systems for affecting call processing. For example, if the user is sitting in his/her living room next to a home wireline telephone while watching television and the user receives an incoming wireless telephone call directed to his/her wireless telephone located in another room, according to embodiments, caller identification information for the incoming wireless communication may be displayed on the user's television set. Upon seeing the display of the incoming call directed to the wireless telephone, the user may select a functionality button or control on the television remote control device or on the wireline telephone device to cause the incoming call directed to the wireless telephone to be automatically routed or forwarded to the wireline telephone so that the user may receive the call at the wireline telephone without having to physically retrieve the wireless telephone for receiving the call. Conversely, if the user is not in the physical proximity of the wireline telephone, and the user receives a telephone call directed to the wireline telephone system, and caller identification information for the incoming wireline telephone call is displayed on the user's television set, the user may select a functionality button or control on the television remote control device or wireless handset to cause the incoming wireline telephone call to be routed to the user's wireless telephone device so that the user may receive the call at the wireless telephone device without having to move to the location of the wireline telephone for receiving the call through the wireless telephone device.

As will be described below with reference to FIG. 1, preferences for each of the wireline telephone, wireless telephone and television services systems may be set at each of these systems separately, or may be set with each of these systems through a centralized management system where each of the types of service are provided by a single services provider or where each service provider is equipped to receive user preferences through a centralized management system such as a web services system operative to communicate with each services provider. In addition, as will be described below with reference to FIG. 1, presence information associated with a multitude of electronic devices operated by or in the proximity of a user may be utilized for automatically detecting user presence and for setting call processing configuration information for processing communications as described herein.

When a user of one or more electronic devices or systems moves into or out of the presence of the one or more devices or systems, detection or determination of the user's presence or lack of presence may be used to apply setup or settings changes to the one or more devices or systems. The user's presence relative to the one or more devices or systems may be detected according to a variety of means. As should be appreciated, a device may include any device capable of being uniquely identifiable and can either be detected or can detect and communicate its location. A wireless device carried by the user may be detected by a wireless presence detector, or alternatively, a wireless device may detect a change in physical presence (e.g., presence of a familiar Wi-Fi hotspot or known BLUETOOTH device, etc.), and may communicate presence information to a presence server. Online/offline status of a user with respect to an Internet connection may be used to detect/determine presence of the user. Use of a wireline or wireless telephone, a VoIP-technology equipped device, a video conferencing system device, cable television set-top box or other device connected to a services provider may be used to determine presence information for the user. Physical presence may also be determined via traditional wireless carrier location determining methodologies such as, but not limited to: triangulation, trilateration, multilateration, etc. Physical presence may be determined via a GPS or assisted GPS system. Other location-detection systems (e.g., RFID tags) may be incorporated into a frequently carried device (e.g., a wallet), and may be detected upon ingress or egress of a specific location.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 illustrates a system architecture with which embodiments of the present invention may be practiced. Referring to FIG. 1, three example communications services providers are illustrated for providing a variety of communications services to a user, home, business, or other facility 110 (hereafter "facility"). Along the upper side of FIG. 1, a wireline telephone data network 115 is illustrated for providing traditional publicly switched wireline telephony and data to the facility 110. A service control point 117 is illustrated in association with the wireline telephone/data network 117 for providing intelligent communication services to telecommunications end points in the facility 110. For example, if calls are made via the wireline telephone/data network 117 to a wireline telephone 140, or if wireline data is provided via the wireline network 115 to a wireline computer 135, the service control point 117 may be operative for providing specialized call features and data management, for example, call forwarding, caller identification, data bandwidth management, data rate, and the like.

A wireless telephone/data network 120 with an associated wireless transmission point 170 (e.g., cell tower) is illustrated for providing wireless telephony and data services to one or more end points in the facility 110. For example, a wireless telephone 150 may be used for sending and receiving voice, video, and data communications via the wireless telephone/data network 120. A computer 145 is illustrated for sending and receiving wireless data and other wireless-enabled communications via the wireless telephone/data network 120. An IMS server 122 is illustrated in association with the wireless telephone/data network 120 for managing and processing data associated with subscribers and subscriber features operated via the wireless telephone/data network 120. According to one embodiment, an IMS (Internet Protocol Multimedia Subsystem) server is a system operative to allow for data services, including Internet services, and access to multimedia and voice applications via a wireless network 120.

Referring still to FIG. 1, a cable television/data/telephone network 125 is illustrated for providing cable television services 162 through a cable television/set-top box combination 130. The cable television/data/telephone network 125 is also operative for providing cable-based wireline Internet services 164 to a computer 135 and cable-based wireline telephony services 166 to a wireline telephone 140. Voice service may also include VoIP via a computer, wireless device, or a VoIP phone. Video calling service 168 may be provided, and may include video calling via a wireless device, via a home or business video conferencing system, via a computer, a television, video conferencing phone, etc. CATV 162, data 164, voice 166, and video 168 services may be a combined service offered by a single communications services provider, or alternatively, may be independent services provided by various service providers. The term television/data/telephone network 125 will herein be used to describe any combination of CATV 162, data 164, voice 166, and video 168 services, whether provided independently or as a combined package. A web services platform 127 is illustrated in association with the cable television/data/telephone network 125 for allowing subscriber access to and management of one or more services, features, or data items maintained for and operated on behalf of the subscriber via the cable television/data/telephone network 125.

Operation of a wireline telephone/data network 115, a wireless telephone/data network 120 and a cable television/data/telephone network 125 are well known to those skilled in the art. According to embodiments, each of the networks 115, 120, 125 may operate as independent communications services providers, or each of the networks or a combination of one or more of the networks may be operated via a single communications services provider operative for providing integrated services across the three networks 115, 120, 125, or combinations thereof.

As will be described in detail below, the three illustrated communications networks 115, 120, 125 may be utilized for receiving presence information associated with a subscriber and for altering one or more settings of a given end point device based on a subscriber's presence in proximity to the end point device. For example, detection of the presence of a user/subscriber in the proximity of the user's wireline telephone 140 may cause calls directed to the user's wireless telephone 150 to be automatically routed to the user's wireline telephone 140, or conversely, presence of a user/subscriber outside of the proximity of the wireline telephone 140 may cause calls directed to the user's wireline telephone 140 to be automatically routed to the user's wireless telephone 150. For another example, if the user has set a preference that when the user is not present in the home or facility 110, calls directed to the user's wireline telephone 140 that cause a caller identification message to be displayed on the user's television 131 in association with the set top box 130 or other type of network-connected video content viewing device may be automatically routed to the user's wireless telephone 150, then the caller identification information that otherwise would be displayed on the user's television 131 may be suspended from display to avoid unnecessarily utilizing the caller identification application associated with the television 131 and to avoid annoying others watching the television 131 when the user associated with the incoming call is not present.

In addition, according to other examples, and as will be described below, manual user interaction with the three illustrated communications networks may be enabled based on user preference and user presence information. For example, if the user is sitting next to a wireline telephone and a call is received at the user's wireless telephone along with the display of a caller identification on the user's television 131 in association with the incoming wireless telephone call, the user may be able to manually redirect the call to the user's wireline telephone by selection of a functionality button or control on the user's wireline telephone 140 or on a remote control device associated with the user's television 131 and associated computer functionality, for example, the set top box 130. As another example, if a user is using a computer 135 and a call is received on the user's wireless phone 150, caller identification in association with the incoming wireless call may be displayed on the user's computer screen. The user may be able to manually redirect the call to another communication, such as his/her desk phone by selection of a functionality control displayed on the user's computer screen.

Referring still to FIG. 1, a user, home, business, or other facility 110 is illustrated in which a variety of electronic devices may be situated and/or utilized for providing a variety of services to users and which may be operated according to a variety of different settings particular to individual users. The cable television/set-top box combination 130 is illustrative of a device combination with which a user may receive and view a variety of content items including television content, movies, sports, entertainment, and the like via a cable television/data/telephone network 125. The wireline computer 135, the wireline telephone 140, the wireline alarm system 155, or other wireline devices 160 may be operative for services provisioning and communications via the cable television/data/telephone services network 125 or via a wireline telephone/data network 115. The wireless computer 145, the wireless telephone/data device 150, a wireless-enabled alarm system 155 or other wireless devices 160 may be operative for sending and receiving telephony traffic and data services via the wireless telephone/data network 120.

The wireline telephone 140 may be set up according to user preference such that various features, for example, call forwarding, caller identification, and the like are set up differently for different users. For example, if a given user is not physically in the proximity of the wireline telephone 140, the user may desire that calls from his/her wireless telephone 150 should not be forwarded to the wireline telephone 140 until the user is in the physical proximity of the wireline telephone 140.

The computer 145 with Internet or other data services access via the wireless telephone/data network 120 similarly may be set up for operation, including data access, differently based on the physical proximity of different users to the device. For example, as described above with respect to the computer 135, a parent or supervisor may desire that Internet or other data access via the computer 145 may be limited depending on the physical proximity of various users to the computer 145.

The wireless telephone/data device 150 is illustrative of a portable or hand held computing/communications device that may be set up to operate according to various operating features and/or settings differently for different users. For example, a user may desire that when he/she is in the physical proximity of the wireline telephone 140, that all calls directed to the wireless telephone 150 be automatically forwarded to the wireline telephone 140 so that the user does not receive telephone calls at both the wireless telephone 150 and the wireline telephone 140.

The alarm system 155 is illustrative of an alarm system that may be operatively associated with the facility 110 for providing security services for the facility 110. As should be appreciated, the alarm system 155 may be set up according to a variety of operating features and settings. According to embodiments, setup and/or other settings for the alarm system 155 may be different for different users who are in the presence of the alarm system 155.

The other wireline/wireless devices 160 are illustrative of any other device or system that may be operated in or in association with the facility 110 for which setup and/or other settings may be modified depending on the presence of different users in proximity to the devices 160.

According to embodiments, when the physical presence of a specific user is detected in the physical proximity of one of the electronic devices illustrated in FIG. 1, the user's presence in the physical proximity of the devices may be utilized for modifying the operational setup or settings of one or more of the electronic devices. As used herein, the term "specific or particular user" may refer to an actual specific user or may refer to a user associated with an electronic device or system. For example, if an actual specific user owns and operates a wireless telephone that is used to provide physical presence information of the user for changing settings of a given device or system when the user is in the physical presence of the device or system, then the presence of the example wireless telephone may be used for changing the example settings for that actual specific user. However, if another user (for example, the user's friend or relative) carries the example wireless telephone into the physical presence of the device or system in question, the presence of the wireless telephone may be interpreted as physical presence of the user who owns the wireless telephone as opposed to the person presently carrying the telephone. In such a case, the settings of the given device or system may be changed based on the physical presence of the wireless telephone instead of the physical presence of the user who owns the telephone.

As should be understood, physical proximity to the facility 100 (described herein) may vary according to the different requirements of the various electronic devices. For example, for changing settings to wireless data access for a wireless computing device 145, physical proximity within the range of a wireless transmitter/receiver at the facility may suffice. On the other hand, for changing settings to an alarm system 155, physical proximity within the facility may be a requirement.

Presence information for a given user may be detected according to a variety of different means. According to one embodiment, if a given user is carrying a wireless communications device, for example, the wireless telephone 150, the presence of the wireless communications device 150 may be detected by a variety of detection means for determining that the device is now in the physical proximity of the facility 110.

Referring still to FIG. 1, a wireless presence detector 165 is illustrative of one or more means for detecting presence of a wireless communications device 150. For example, the wireless presence detector 165 may be a wireless fidelity (WIFI) transmitter/receiver situated in the facility 110. When the wireless communications device 150 is brought within operational proximity of the WIFI transmitter/receiver, the wireless communications device 150 may be programmed to automatically detect all WIFI access points within range. Upon detection of a WIFI transmitter/receiver device, location information may be provided and utilized for indicating that the wireless communications device and an associated user are now in the physical proximity of the various devices illustrated in the facility 110. For example, a mobile phone 150 may be carried by a user. The mobile phone 150 may detect an SSID or base station MAC address of the user's home WIFI router via wireless transmission, and may then determine its physical location. Similarly, other wireless transmitter/receiver devices or sensors may be utilized for providing presence information for determining locations of wireless devices with respect to a wireless presence detector 165 and the facility 110 (e.g., low-powered WIFI base stations or BLUETOOTH devices that may be utilized for broadcasting location information and not routing data traffic).

According to other methods, the wireless telephone/data network 120 may determine the presence of a given wireless communications device 150, 145 based on the transmission/reception proximity of the devices to a wireless transmission point 170, for example, a wireless transmission antenna. In addition, satellite based geo-location receivers may be utilized for determining the physical location of the wireless devices 150, 145 and for determining that these devices have been brought into the physical proximity of the facility 110 and of the devices associated therewith. Such satellite based geo-location receivers may be associated with global positioning satellite systems (GPS) of various types, as well as, other types of geo-location systems, such as assisted-GPS (A-GPS) with which a mobile telephone network may be used to provide a starting or "seed" location value of a mobile device to a GPS system to enhance the efficiency of GPS location convergence. Other detection means may include embedded radio frequency identification (RFID) tags or other location-detection systems (for example, common retail anti-theft tags applied to goods) that may be embedded in always-carried devices or articles of clothing or accessories and that may be used to provide physical presence information for a user (for example, when such detection means pass a scanner or are detected upon ingress or egress of a specific area). As should be appreciated, each of the wireless presence detector means or combinations thereof described above may be utilized for determining presence of a user in the physical proximity of the facility 110.

In addition, presence of a given user in the physical proximity of the facility 110 may be determined via other means. For example, if a user utilizes the set-top box 130 by selecting a prescribed viewing profile associated with a particular user, the selection of the particular user profile may be utilized for determining that the particular user is now in the physical proximity of the set-top box 130 and thus the facility 110. For example, in order to utilize a given viewing profile, for example, a prescribed set of viewing channels, a given user may be required to enter a password or other credentials via the set-top box 130. Entry of a password or other credentials by a given user may be utilized for determining that the user is now in the physical proximity of the set-top box 130 and thus the facility 110.

Likewise, particular utilization of a wireline device such as the wireline telephone 140 or wireline data services via the computer 135 may be utilized for determining that a particular user is in the physical presence of the devices 140, 135 and thus in the physical presence of the facility 110. For example, if a particular user is required to enter a password or other credentials for data services, or specialized call processing via one of the devices 140, 135, entry of such password or credentials information may be utilized for determining that the particular user is in the physical presence of the devices 140, 135 and thus in the physical presence of the facility 110. Simple online/offline status of a given user likewise may be used to detect and/or determine the user's physical presence in the proximity of the facility 100.

Use or interaction with other devices in the facility 110, for example, the alarm system 155 or other wireline/wireless devices 160 may similarly be utilized for determining the physical proximity of a given user to those devices and to the facility 110. For example, if a particular user enters a password or other credentials into an alarm system 155, receipt of the password or other credentials may be utilized for determining that the particular user is now in the physical presence of the device/system and in the physical presence of the facility 110.

According to embodiments, physical presence information received for a particular user via one of the means described above may be passed to a presence server 175, illustrated in FIG. 1, in operative communication with each of the networks 115, 120, 125. According to embodiments, the presence server 175 is a general purpose computing system operative to receive and store presence information for a particular user for utilization of the presence information for modifying feature setup or other settings associated with one or more of the devices illustrated in the facility 110. According to one embodiment, the presence server 175 may operate as a standalone presence server from which presence information may be pushed out to interested services/systems or from which presence information may be pulled by interested services/systems as described below. Alternatively, the presence server 175 may be associated with one or more of the networks 115, 120, 125 for receiving presence information through the respective networks 115, 120, 125 and for providing presence information to the networks 115, 120, 125. For example, presence information obtained via detection of a WIFI network via a wireless device 150, 145 via a wireless presence detector 165 may be transmitted directly to the presence server 175 for subsequent use.

Alternatively, presence information determined from use of any of the devices illustrated in the facility 110 may be passed to the presence server via the individual networks 115, 120, 125 through which the devices are operated. For example, if presence information for a particular user is determined based on the user's access to the cable television/set-top box 130, presence information for the particular user may be passed to the presence server 175 via the cable television/data/telephone network 125. Similarly, presence information determined by the physical location on a wireless device 150, 145 may be passed to the presence server 175 via the wireless telephone/data network 120. Similarly, presence information for a particular user determined by the user's access to a wireline device 140, 135 may be passed to the presence server 175 via the wireline telephone/data network 115. Other devices, for example, the alarm system 155 may pass presence information for a particular user to the presence server 175 via a third party alarm system services provider or via one of the wireline, wireless, or cable-enabled communications networks 115, 120, 125. Alternatively, physical presence information may be detected and transmitted directly from a wireless device 150, 145 to a second device or system for which operational settings or setup data may be changed.

According to an embodiment, a configuration server 176 or application may be utilized for mapping end-point devices comprising operational settings or setup data that may be changed, which presence-detection-enabling devices may be within range of the end-point devices, and which users and features may be mapped to each end-point device and/or location. The configuration server 176 is illustrated in FIG. 1 as an independent component, but as should be appreciated the configuration server 176 may be an application integrated with both client-side devices and/or systems at the facility 110, with server-side devices and/or systems 115, 120, 125, or the configuration server 176 may operate independently of such devices or system where data is pulled from the server 176 by requesting devices/systems or where data is pushed from the server 176 to requesting devices/systems.

Figure 2:
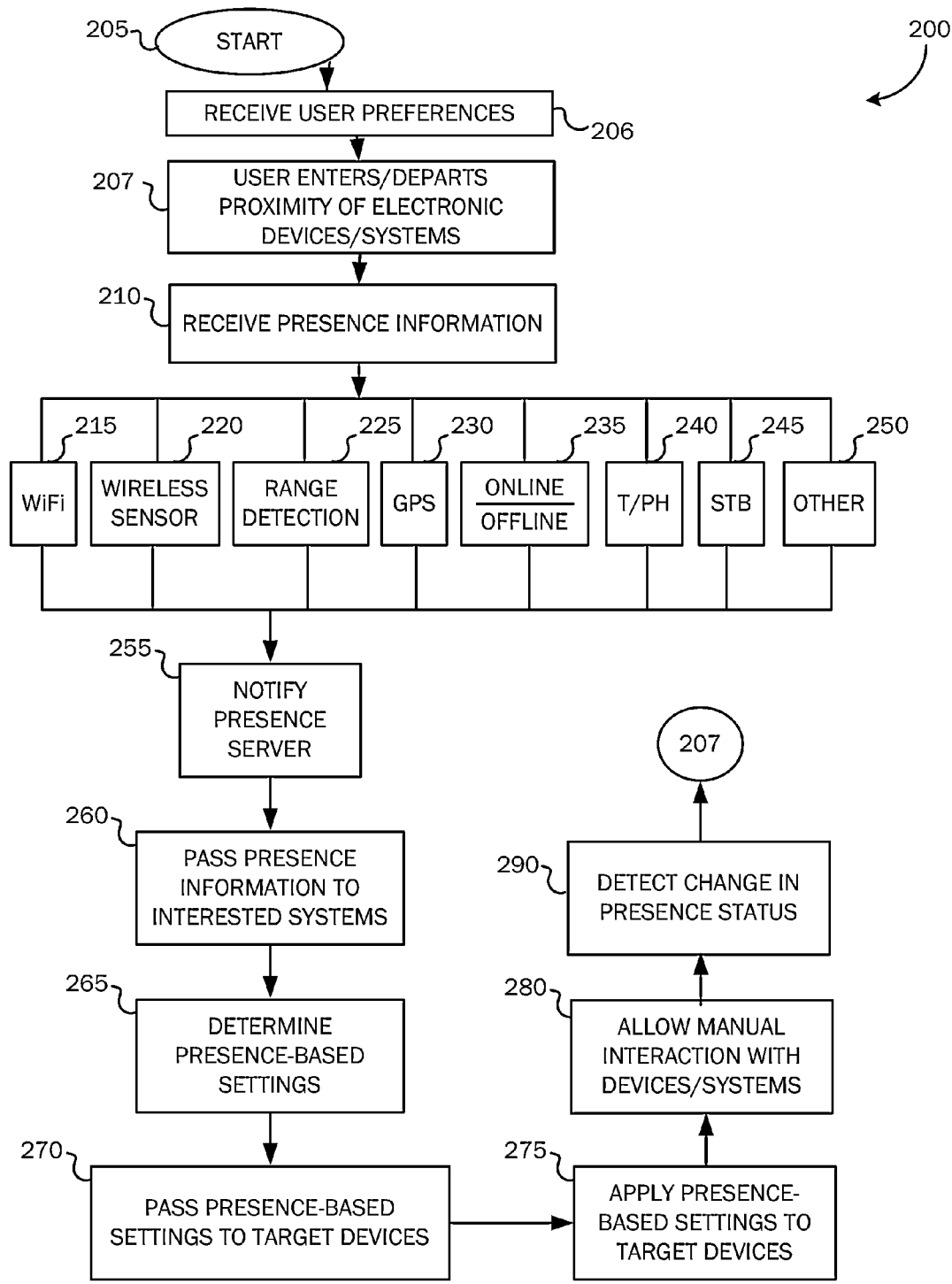
FIG. 2 is a flow diagram illustrating a routine for automating device/system setup based on user preferences and user presence information.

Having described a system architecture with which embodiments of the present invention may be practiced, FIG. 2 is a flow diagram illustrating a routine for automating device/system setup based on user preferences and user presence information. As described above, embodiments of the present invention are directed to automated device/system setup based on user presence information. When a user of one or more electronic devices or systems moves into the presence of the one or more devices or systems, detection or determination of the user's presence may be used to apply setup or settings changes to the one or more devices or systems. For purposes of illustration with respect to the description of FIG. 2 below, consider an example use case in which a user enters a home 110 where the user's presence in proximity of the home is used to make various settings changes to the user's communications devices/systems as described herein.

The routine 200 begins at start operation 205 and proceeds to operation 206. At operation 206, user preferences are received by one or more of the communications networks 115, 120, 125. For example, a user may identify to each of the wireless and wireline telecommunications systems one or more callers to be associated with specialized call processing based on presence information for the user. For example, a user may provide a list of telephone directory numbers associated with a number of callers for whom the user requires specialized call processing when a call from one of the specified callers is received at the wireless and/or wireline telephone systems directed to the user. For example, if a call is received from a particular caller, for example, the user's co-worker, and caller identification information for the incoming call is prescribed to be displayed on the user's television 131 via the cable/data/telephone network 125, the user may prefer that the caller identification information not be displayed on the television 131 when the user is not physically present near the television 131.

Thus, at operation 206, the user may pass preference information to the wireless and wireline telecommunications networks and to the cable/TV/data/telephone network 125 such that, if presence information is detected and is passed to the communications networks/systems indicating that the user is not physically present near the television 131, then incoming calls directed to a wireline telephone 140 in the home 110 should be forwarded to the user's wireless telephone 150 and caller identification information for the incoming calls should not be displayed on the television 131 to avoid use of the caller identification application associated with the television 131 and to avoid annoying others viewing the television 131 when the user for whom the call is received is not present in the proximity of the television 131.

Other examples of user preferences received at operation 206 include preferences for allowing the user to manually interact with the communications systems 115, 120, 125 for incoming communications. For example, if an incoming call is directed to the user's wireless telephone, and if a caller identification information for the incoming call is displayed on the user's television 131, but if the user is physically located next to his/her wireline telephone 140, the user may set a preference for allowing the user to selectively/manually route calls directed to the wireless telephone to the wireline telephone via interaction with the television 131 through the set top box 130 by selecting an appropriate functionality button or control on a remote control device associated with the television 131. Thus, the user's preferences must be set at each of the communications systems/networks 115, 120, 125 so that appropriate call processing signaling is passed between the various networks/systems for processing calls according to the user's preferences or manual selections.

At operation 207 a user enters the proximity of one or more electronic devices, for example, the electronic devices and/or systems illustrated in the facility (e.g., home) 110. As should be appreciated, operation 207 is equally applicable to detection of the user leaving the proximity of the one or more devices. That is, the receipt of physical presence information of a particular user includes both "in proximity" and "out of proximity" information. In both cases, the operational settings or setup data of one or more electronic devices or systems may be changed. For example, just as settings for a device may be personalized for a user when the user enters the physical presence of the device, so may the settings for the device be changed to another configuration when the user leaves the physical presence of the device. At operation 210, presence information for the user is received via one or more presence detection or presence determination means, as described above with reference to FIG. 1, and as further described below with reference to operations 215 through 250.

At operation 215, if the user is carrying a wireless device 150, 145, for example, a wireless telephone, personal digital assistant (PDA), or wireless computer, the wireless device 150, 145 may detect the presence of a wireless fidelity (WIFI) transmitter/receiver for purposes of connecting with a WIFI with a hotspot for sending and receiving wireless signaling from the wireless device. According to embodiments of the present invention, when the wireless device detects a WIFI signal transmitted via a WIFI transmitter/receiver, physical presence information associated with the wireless device may be passed through the wireless network 120 to the presence server 175 and may be stored for the user. Alternatively, physical presence information associated with the wireless device may be transmitted via an appropriate network to a target device contained in or operated in association with a facility.

At operation 220, the wireless presence detector 165 in the form of a non-WIFI wireless sensor may detect the presence of the wireless devices being carried by the user, and may likewise pass presence information for the user through the wireless network 120 to the presence server 175. As described above, a variety of other wireless presence detection means, for example, BLUETOOTH, infrared (IR), and the like may be equally utilized. In addition, as described above, such information may be passed to the presence server 175, or such information may be passed directly from a user-associated device, such as a carried mobile telephone, to a device or system for which operational settings or setup data may be changed based on the physical presence of the user.

At operation 225, one or more wireless-based positioning technologies (e.g., range detection, triangulation, trilateration, multilateration, observed time difference, time difference of arrival, angle of arrival, etc.) may be employed by the wireless network 120 for determining a location of a wireless device. For example, range detection may be employed by the wireless network 120, wherein a range from the user and his/her wireless devices may be determined based on signal strength from the wireless device to a wireless transmission point 170 (e.g., wireless transmission tower) for determining whether the user and his/her wireless devices are in prescribed physical proximity to the electronic devices contained in the facility 110. Presence information determined for the user via range detection may be passed through the wireless network 120 to the presence server 175.

At operation 230, a satellite-based geo-location receiver (e.g., GPS receiver) operated in the wireless device carried by the user may be utilized for determining global positioning satellite coordinates for the user. Such GPS coordinates may be transmitted through the wireless network 120 to the presence server 175 on a periodic basis. At the presence server 175, the GPS coordinates received for the wireless devices 150, 145 may be compared with GPS coordinates of the facility 110. When the GPS coordinates of the wireless devices 150, 145 carried by the user are within a prescribed proximity to the coordinates of the facility 110, a determination may be made at the presence server 175 that the user and his/her wireless devices are now in the presence of the electronic devices contained in or operated in association with the facility 110.

At operation 235, online/offline status of the user with respect to wireline or wireless data services (e.g., Internet connection) may be utilized to determine that the user is present in the facility 110. As described above with reference to FIG. 1, the online/offline status of the user may be utilized by a data services provider, for example, the wireline telephone network 115, the wireless network 120 or the cable television/data/telephone network 125 for passing presence information to the server 175 for subsequent use.

At operation 240, utilization of a wireline telephone 140 may be utilized for passing presence information for the user from a wireline network 115 to the presence server 175. For example, if the user is identified through a password or other credentials to allow the wireline network 115 to determine that the present user of the wireline telephone 140 is the user for which presence information is of interest, the wireline network 115 may pass presence information for the user to the presence server 175.

At operation 245, utilization by the user of the set-top box 130 may allow a cable television/data/telephone network 125 to determine that the user is present in the facility 110. For example, selection of a particular user profile may allow the cable network 125 to determine that a particular user of interest is physically present in the facility 110, and presence information for the user may be passed to the presence server 175.

At operation 250, use of other electronic devices in the facility 110, for example, use of the alarm system 155, or use of other wireline or wireless devices by a particular user may be utilized for determining that the particular user is present in the facility 110. For example, a particular user may be required to enter a password or other credentials for activating, deactivating or otherwise interacting with an alarm system 155. Such information may be utilized for determining that the particular user is present in the facility 110, and such information may be passed through one or more of the networks 115, 120, 125 or through a third party network, for example, a third party alarm system, to the presence server 175.

According to embodiments, use of an electronic device in the facility for indicating user presence may include notifying a network component (e.g., a wireless, wireline or cable services network component) of the use of the electronic device or of the use of another electronic device associated with the electronic device. That is, notification of the use of the one or more devices is passed to a network component operative to interpret the use of the electronic device or the use of another electronic device as an indication that the user is in a physical proximity of the electronic device. For example, a user's setting of channels on a set-top box may cause a notification to a cable services system that the user is in the presence of the set-top box.

At operation 255, presence information for a particular user detected or determined through one of the above-described means may be passed to the presence server for subsequent use. According to one embodiment, a database object may be maintained at the presence server 175, the configuration server 176, or other suitable storage location that may represent a list of "interested devices or systems" that will receive physical presence information for a given user as the presence information changes.

At operation 260, presence information for a particular user may be passed to interested systems. For example, the presence information for one or more particular users located in the facility 110 may be passed to the wireline telephone network 115, the wireless network 120, or the cable television/data/telephone network 125, or other interested systems, or any other interested system responsible for managing or providing services to one or more electronic devices or systems in the facility 110. As should be appreciated, an interested system may be in a fixed geographical location, or may be in a variable geographic location. For example, physical presence information for a particular user may be passed to a car, wherein various settings may be applied depending on the presence of the particular user.

According to embodiments, presence information passed from the presence server 175 to interested systems may be passed to the systems on a push or pull basis. That is, on a periodic frequency, for example, once every ten seconds or once every five minutes, presence information may be pushed from the presence server out to each interested system that is registered with the presence server for receiving presence information for one or more particular users. Conversely, presence information may be pushed to an interested system upon detection of a change of presence information. For example, upon a user's arrival at home, an "at home" presence status may be pushed to his/her home devices. Subsequent presence information may not be pushed to his/her home devices until the next morning, when the user leaves his/her home. Alternatively, presence information may be pulled from the presence server 175 by interested systems on a frequency established for each individual system. For example, the cable network 125 may pull presence information from the presence server for its customers/subscribers once every five minutes. On the other hand, a wireless network 120 may pull presence information from the presence server 175 for its customers/subscribers once every ten seconds. As should be appreciated, each individual interested system may need presence information for particular users on different frequencies depending on the services provided by the individual communications systems.

At operation 265, a determination is made as to presence-based settings applicable to one or more electronic devices operating in the facility 110. For example, if a particular user is detected as being present within the facility 110, all calls directed to the user's wireless telephone 150 may be routed to the user's wireline telephone 140 when the user is detected as being present in the proximity of the wireline telephone 140. Such an automatic routing may prevent the user from needlessly using wireless telephone usage units (for example, usage minutes) when the user is in the physical proximity of the wireline telephone 140. For another example, if the user is detected as being outside the proximity of the wireline telephone 140, all calls directed to the wireline telephone 140 may be automatically routed to the user at his/her wireless telephone 150.

For another example, as described herein, if caller identification information is displayed on the user's television set 131 for incoming calls to the user's wireline telephone 140, and presence information detected for the user indicates the user is not in the proximity of the television set 131 and/or the wireline telephone 140, calls may be automatically routed to the user at his/her wireless telephone 150, and a display of caller identification information may be suspended so that needless use of the caller identification application associated with the television 131 is avoided and so that any annoyance to others viewing the television 131 is avoided so that caller identification information for the benefit of a user that is not present is not needlessly displayed.

At operation 270, presence-based settings are passed from the appropriate networks 115, 120, 125 to the target devices contained in or operated in association with the facility 110. According to embodiments, user preferences may be stored at the backend systems of the networks 115, 120, 125, or may be stored at the client side at the one or more electronic devices in the facility 110. For example, call forwarding preferences implemented based on the user's presence at the facility 110 may be stored at a wireless or wireline network backend or via client side applications/memory at local wireline and wireless telephones. For another example, user preferences that allow for a user to manually or selectively route a call to a wireless or wireline telephone based on the user's physical location relative to one or the other of the wireless or wireline telephone in association with caller identification information displayed on a user's television set 131 may be stored at each of the wireless and wireline networks 115, 120 and at the cable TV/data/telephone networks 125. As should be appreciated, functionality for passing presence-based settings to the target devices may be maintained and operated in the networks 115, 120, 125, or functionality for processing presence-based settings changes to the target devices may be operated by client-side applications operated at the target devices at the facility 110 based on presence information passed to the target devices from the presence server via one or more of the networks 115, 120, 125.

At operation 275, presence-based settings are applied to the one or more target devices either from a backend application at one or more of the networks 115, 120, 125 or via client-side applications operated on each of the one or more target devices based on presence information passed to the target devices. According to embodiments, presence-based settings are applied to personalize the settings or set up of the one or more electronic devices based on the user's presence in proximity of the one or more electronic devices. That is, one or more functionalities of the electronic device(s) may be personalized for the user based on one or more preferences of the user.

As should be appreciated, changes made to the operational settings or setup data for one or more target devices may be performed based on the physical presence of multiple users. For example, in a given household, two or more members of a family may be in the physical presence of the one or more target devices, and device settings associated with each of the members/users may be applied. According to one embodiment, all settings associated with all physically present users may be applied simultaneously. For example, if one physically present user enters a user preference that all calls directed to the wireline telephone 140 at the user's home be directed to the user's wireless telephone 150, but if another user present at the same home enters a preference that all calls directed to the second user's wireless telephone 150 be directed to the wireline telephone 140, then the conflicting preferences may be resolved such that only those calls directed to the second user's wireless telephone are routed to the wireline telephone 140 and that such calls routed to the telephone 140 are not in turn routed back to the first user's wireless telephone 150. As should be appreciated, the various settings for various users and any hierarchical relationships between settings (e.g., parent versus child) may be stored as user profile data for the various users and may be accessed by a given device for application based on the physical presence of different users. Such data may be stored in the configuration server 176 or similar remote storage site, or such data may be stored on the client-side of any given interested target device or system.

At operation 280, manual or selective interaction with the communications systems 115, 120, 125 may be allowed based on user preference and user presence information. For example, if a user is sitting next to a wireline telephone 140, and the user is presently viewing content on the television 131, a user preference may be entered by the user to allow the user to manually or selectively route calls directed to the user's wireless telephone 150 to the user's wireline telephone 140 when the user is presented with caller identification information for a call being received at the user's wireless telephone 150 on the user's television 131. That is, if caller identification information for a call coming into the user's wireless telephone 150 is displayed in the user's television 131, the user may be allowed to selectively or manually cause a forwarding of the call directed to the wireless telephone to the user's wireline telephone by pressing a functionality button or control on a remote control device associated with the television 131, or by selecting a similar functionality button or control on the wireline telephone 140. Conversely, if the user is not in the physical proximity of the wireline telephone 140, and if an incoming call is directed to the wireline telephone 140, and associated caller identification is displayed on the television 131, the user may be allowed to manually or selectively forward the call to the user's wireless telephone 150.

As should be appreciated, communications between the disparate communications systems 115, 120, 125 may be affected by any suitable communications protocol operative for passing data between the communications for processing communications as described herein. For example, a call forwarding instruction passed via the television set 131 through a remote control device may be passed through the set top box 130 or other associated computing functionality functionally associated with the television 131 through to the cable TV/data/telephone network 125. Such information received at the cable television/data/telephone network 125 may be passed to the wireless telephone/data network 120 via the IMS server 122 for causing a call directed to the wireless telephone 150 to be routed to the wireline telephone 140. In such a case, signaling from the wireless telephone/data network 120 to the wireline telephone/data network 115 through an intelligent network device or system, for example, the service control point 117 may be utilized for causing the call originally directed to the wireless telephone 150 to be forwarded to the wireline telephone 140. Thus, according to this example, a call originally directed to the wireless telephone 150 may be forwarded or routed to the wireline telephone 140 via a communication with the television services provider network 125 that ultimately corresponds or communicates with the wireless telephone/data network 120 for forwarding the incoming wireless call to the wireline telephone 140. As should be appreciated, this is but one example of the numerous call flows that may be performed for processing incoming calls to the wireless and/or wireline telephone calls via user preferences and user presence information.

At operation 290, any changes in presence information for one or more users present in or near the facility 110 are detected or determined. For example, if a particular user is presently in the facility 110, but leaves the facility 110, a determination that the particular user is no longer present in the 110 may be passed to the present server 175, and any settings changes applicable to the devices operated in the facility 110 may be made in accordance with the change in presence status for the particular user. The routine then may proceed back to operation 207 where physical presence information for one or more users may be detected and utilized as described herein.

Figure 3:
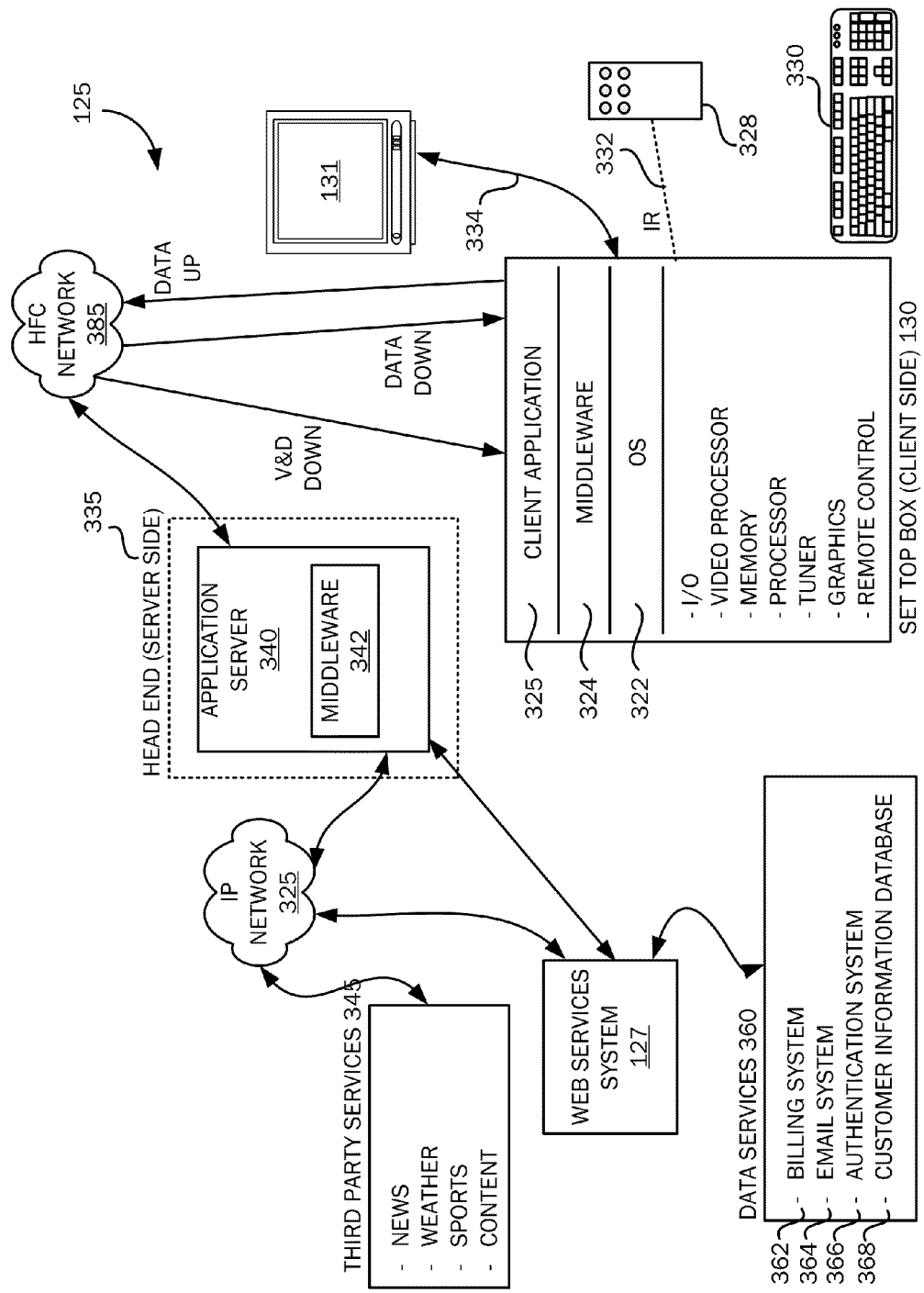
FIG. 3 illustrates a system architecture of a cable television services system with which some embodiments of the present invention may be implemented.

As described above with reference to FIGS. 2 and 3, one network with which embodiments of the invention may be practiced includes a cable television/data/telephone network 125. FIG. 3 is a simplified block diagram illustrating a cable services system (hereafter referred to as "CATV") architecture that may serves as an exemplary operating environment for embodiments of the present invention.

Referring now to FIG. 3, digital and analog video programming, information content and interactive television services are provided via a hybrid fiber coax (HFC) network 150 to a television set 160 for consumption by a cable television/services system customer. The functionality of the HFC network 150 allows for efficient bidirectional data flow between the client-side set-top box 155 and the server-side application server 340 of the present invention. Embodiments of the present invention are not limited to an HFC network 150, but may include other transport mediums included, but not limited to, an all fiber system, an all coax system, and an IP Ethernet-based system. According to embodiments of the present invention, the CATV system 125 is in the form of a distributed client-server computing system for providing video and data flow across the HFC network 150 between server-side services providers (e.g., cable television/services providers) via a server-side head end 145 and a client-side customer via a client-side set-top box (STB) functionally connected to a customer receiving device, such as the television set 160.

On the client side of the CATV system 125, digital and analog video programming and digital and analog data are provided to the customer television set 160 via the set-top box (STB) 130. Interactive television services that allow a customer to input data to the CATV system 125 likewise are provided by the STB 130. As illustrated in FIG. 3, the STB 130 is a multipurpose computing device having a computer processor, memory and an input/output mechanism. The input/output mechanism receives input from server-side processes via the HFC network 150 and from customers via input devices such as the remote control device 175 and the keyboard 330.

Because a variety of different operating systems 322 may be utilized by a variety of different brands and types of set-top boxes, a middleware layer 324 is provided to allow a given software application to be executed by a variety of different operating systems. According to an embodiment of the present invention, the middleware layer 324 may include a set of application programming interfaces (API) that are exposed to client applications 325 and operating systems 322 that allow the client applications to communicate with the operating systems through common data calls understood via the API set. Referring still to FIG. 3, the head end 145 of the CATV system 125 is positioned on the server side of the CATV system and includes hardware and software systems responsible for originating and managing content for distributing through the HFC network 150 to client-side STBs 130 for presentation to customers via televisions 160. As described above, a number of services may be provided by the CATV system 125, including digital and analog video programming, interactive television services, telephone services, video-on-demand services, targeted advertising, and provision of information content.

The application server 340 is a general-purpose computing system operative to assemble and manage data sent to and received from the client-side set-top box 130 via the HFC network 150. As described above with reference to the set-top box 130, the application server 340 includes a middleware layer 342 for processing and preparing data from the head end of the CATV system 125 for receipt and use by the client-side set-top box 130. For example, the application server 340 via the middleware layer 342 may obtain data from third-party services 346 via the Internet 120 for transmitting to a customer through the HFC network 150 and the set-top box 130. For example, a weather report from a third-party weather service may be downloaded by the application server via the Internet 120. When the application server 340 receives the downloaded weather report, the middleware layer 342 may be utilized to format the weather report for receipt and use by the set-top box 130. According to one embodiment of the present invention, data obtained and managed by the middleware layer 342 of the application server 340 is formatted according to the Extensible Markup Language and is passed to the set-top box 130 through the HFC network 150 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 340 via distributed computing environments such as the Internet 120 for provision to customers via the HFC network 150 and the set-top box 130.

According to embodiments of the present invention, the application server 340 obtains customer profile data from services provider data services 360 for preparing a customer profile that may be utilized by the set-top box 130 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 3, the services provider data services 360 include a number of services operated by the services provider of the CATV system 125 which may include data on a given customer. For example, a billing system 362 may include information such as a customer's name, street address, business identification number, Social Security number, credit history, and information regarding services and products subscribed to by the customer. An electronic mail system 364 may contain information such as electronic mail addresses, high-speed Internet access subscription information and electronic mail usage data. An authentication system 366 may include information such as secure user names and passwords utilized by customers for access to network services. The customer information database 368 may include general information about customers such as place of employment, business address, business telephone number and demographic information such as age, gender, educational level, and the like. As should be understood by those skilled in the art, the disparate data services systems 362, 364, 366, 368 are illustrated as a collection of data services for purposes of example only. The example data services systems comprising the data services 360 may operate as separate data services systems, which communicate with a web services system (described below) along a number of different communication paths and according to a number of different communication protocols.

Although described herein with respect to setup changes to various electronic devices via server side and or client side applications, in alternative embodiments, the invention may be used in combination with any number of computer systems, such as in desktop environments, laptop or notebook computer systems, multiprocessor systems, micro-processor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer readable media, such as secondary storage devices, like hard disks, floppy disks, or a CD-ROM, a carrier wave from the Internet, or other forms of RAM or ROM.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of processing communications to and from multiple communications systems based on user preferences and based on presence information for one or more users of the communications systems, comprising:

receiving first user preferences for operation of each of the multiple communications systems for when a first user is in a physical location with respect to each of the multiple communications systems;

receiving second user preferences for operation of each of the multiple communications systems for when a second user is in the physical location with respect to each of the multiple communications systems;

establishing an hierarchical relationship between the first user and the second user that is utilized for resolving conflicts between the first user preferences and second user preferences such that the first user preferences take precedence over the second user preferences;

receiving presence information for the first user and the second user of the multiple communications systems, the presence information indicating the first user and the second user is in the physical location with respect to at least one of the multiple communications systems;

determining whether the first user preferences conflict operationally with the second user preferences for the at least one of the multiple communications systems; and if the first user preferences conflict with the second user preferences for the at least one of the multiple communications systems, resolving conflicts such that the first user preferences take precedence over the second user preferences:

passing the presence information for the first user of the multiple communications systems to the at least one of the multiple communications systems to indicate the first user is in the physical location with respect to the at least one of the multiple communications systems; and in response to receiving the presence information for the first user of the multiple communications systems at the at least one of the multiple communications systems, changing one or more settings of one or more of the other multiple communications systems for receiving a second communication for the second user based on the indication that the first user is in the physical location with respect to the at least one of the multiple communications systems.

2. The method of claim 1, wherein changing one or more settings of one or more of the other multiple communications systems based on the first user preferences for operation of the one or more of the other multiple communications systems and based on the indication that the first user is in the physical location with respect to the at least one of the multiple communications systems includes automatically changing the one or more settings.

3. The method of claim 2, wherein automatically changing the one or more settings includes automatically changing the one or more settings based on signaling to the one or more of the other multiple communications systems from a service provisioning system responsible for providing a communications service to the one or more of the other multiple communications systems.

4. The method of claim 3, wherein signaling to the one or more of the other multiple communications systems from a service provisioning system responsible for providing a communications service to the one or more of the other multiple communications systems is in response to receiving the presence information for the first user of the multiple communications systems at the service provisioning system responsible for providing a communications service to the one or more of the other multiple communications systems.

5. The method of claim 4, wherein prior to changing one or more settings of the one or more of the other multiple communications systems based on the first user preferences, querying a user preferences database for first user preferences.

6. The method of claim 1, wherein receiving first user preferences for operation of each of the multiple communications systems when the first user is in the physical location with respect to each of the multiple communications systems includes receiving first user preferences for operation of each of the multiple communications systems when the first user is out of the physical proximity of each of the multiple communications systems.

7. The method of claim 1, wherein receiving first user preferences for operation of each of the multiple communications systems when the first user is in the physical location with respect to each of the multiple communications systems includes receiving first user preferences for operation of each of the multiple communications systems when the first user is in a physical proximity of each of the multiple communications systems.

8. The method of claim 1,
wherein receiving presence information for the specific user of the multiple communications systems, the presence information indicating the first user is in a physical proximity of a wireline communications system;
wherein passing the presence information for the first user of the multiple communications systems includes passing the presence information to the wireline communications system to indicate the first user is in the physical proximity of the wireline communications system; and
wherein in response to receiving the presence information for the first user of the multiple communications systems at the wireline communications system, changing one or more settings of wireless communications device based on the first user preferences for operation of the wireless communications device and based on the indication that the first user is in the physical proximity of the wireline communications system.

9. The method of claim 1,
wherein receiving presence information for the first user of the multiple communications systems, the presence information indicating the first user is in a physical proximity of a wireless communications system;
wherein passing the presence information for the first user of the multiple communications systems includes passing the presence information to the wireless communications system to indicate the first user is in the physical proximity of the wireless communications system; and
wherein in response to receiving the presence information for the first user of the multiple communications systems at the wireless communications system, changing one or more settings of a wireline communications device based on the first user preferences for operation of the wireline communications device and based on the indication that the first user is in the physical proximity of the wireless communications system.

10. The method of claim 1,
wherein receiving presence information for the first user of the multiple communications systems, the presence information indicating the first user is in a physical proximity of a network connected video content viewing device;
wherein passing the presence information for the first user of the multiple communications systems includes passing the presence information to the network connected video content viewing device to indicate the first user is in the physical proximity of the network connected video content viewing device; and wherein in response to receiving the presence information for the first user of the multiple communications systems at the network connected video content viewing device, changing one or more settings of a wireless or wireline communications device based on the first user preferences for operation of the wireless or wireline communications device and based on the indication that the first user is in the physical proximity of the network connected video content viewing device.

11. The method of claim 10,
wherein indicating the first user is in a physical proximity of a network connected video content viewing device includes indicating the first user is in the physical proximity of a cable television services system set top box.

12. The method of claim 1, wherein receiving presence information for the first user of the multiple communications systems includes receiving signaling from a wireless communications device physically associated with the first user at a wireless presence detector located in a physical proximity of the multiple communications systems.

13. The method of claim 12, wherein passing the presence information for the first user of the multiple communications systems to the at least one of the multiple communications systems to indicate the first user is in the physical location with respect to the at least one of the multiple communications systems includes passing the presence information to the at least one of the multiple communications systems via the wireless presence detector.

14. The method of claim 1, wherein receiving presence information for the first user of the multiple communications systems includes detection by a wireless presence detector by a second electronic device in a possession of the first user; and
wherein passing the presence information for the first user of the multiple communications systems to the at least one of the multiple communications systems to indicate the first user is in the physical location with respect to the at least one of the multiple communications systems includes passing the presence information directly from the second electronic device to the at least one of the multiple communications systems for which one or more settings are changed based on the indication that the first user is in the physical location with respect to the at least one of the multiple communications systems.

15. A computer readable storage device containing computer executable instructions which when executed by a computer perform a method of processing communications to and from multiple communications systems based on first user preferences and based on presence information for one or more users of the communications systems, comprising:
receiving first user preferences for operation of each of the multiple communications systems for when a first user is in a physical proximity of each of the multiple communications systems;
receiving second user preferences for operation of each of the multiple communications systems for when a second user is in the physical location with respect to each of the multiple communications systems;
establishing an hierarchical relationship between the first user and the second user that is utilized for resolving conflicts between the first user preferences and second user preferences such that the first user preferences take precedence over the second user preferences;
receiving presence information for the first user and the second user of the multiple communications systems, the presence information indicating the first user and the second user is in the physical location with respect to at least one of the multiple communications systems;

determining whether the first user preferences conflict operationally with the second user preferences for the at least one of the multiple communications systems; and if the first user preferences conflict with the second user preferences for the at least one of the multiple communications systems, resolving conflicts such that the first user preferences take precedence over the second user preferences:

passing the presence information for the first user of the multiple communications systems to the at least one of the multiple communications systems to indicate the first user is in the physical location with respect to the at least one of the multiple communications systems; and in response to receiving the presence information for the first user of the multiple communications systems at the at least one of the multiple communications systems, changing one or more settings of one or more of the other multiple communications systems for receiving a second communication for the second user based on the indication that the first user is in the physical location with respect to the at least one of the multiple communications systems.

16. The computer readable storage device of claim 15, wherein receiving first user preferences for operation of each of the multiple communications systems when the first user is in a physical proximity of each of the multiple communications systems includes receiving first user preferences for operation of each of the multiple communications systems when the first user is out of the physical proximity of each of the multiple communications systems.

17. The computer readable storage device of claim 15, wherein receiving presence information for the first user of the multiple communications systems, the presence information indicating the first user is in a physical proximity of a wireline communications system;

wherein passing the presence information for the first user of the multiple communications systems includes passing the presence information to the wireline communications system to indicate the first user is in the physical proximity of the wireline communications system; and wherein in response to receiving the presence information for the first user of the multiple communications systems at the wireline communications system, changing one or more settings of wireless communications device based on the first user preferences for operation of the wireless communications device and based on the indication that the first user is in the physical proximity of the wireline communications system.

18. The computer readable storage device of claim 15, wherein receiving presence information for the first user of the multiple communications systems, the presence information indicating the first user is in the physical proximity of a wireless communications system;

wherein passing the presence information for the first user of the multiple communications systems includes passing the presence information to the wireless communications system to indicate the first user is in the physical proximity of the wireless communications system; and wherein in response to receiving the presence information for the first user of the multiple communications systems at the wireless communications system, changing one or more settings of a wireline communications device based on the first user preferences for operation of the wireline communications device and based on the indication that the first user is in the physical proximity of the wireless communications system.

19. The computer readable storage device of claim 15, wherein receiving presence information for the first user of the multiple communications systems, the presence information indicating the first user is in a physical proximity of a cable television services system set-top box;

wherein passing the presence information for the first user of the multiple communications systems includes passing the presence information to the cable television services system set-top box to indicate the first user is in the physical proximity of the cable television services system set-top box; and wherein in response to receiving the presence information for the first user of the multiple communications systems at the cable television services system set-top box, changing one or more settings of a wireless or wireline communications device based on the first user preferences for operation of the wireless or wireline communications device and based on the indication that the first user is in the physical proximity of the cable television services system set-top box.

20. A method of processing communications to and from multiple communications systems based on first user preferences and based on presence information for one or more users of the communications systems, comprising:

receiving first user preferences for operation of each of the multiple communications systems for when a first user is in a physical location with respect to each of the multiple communications systems;

receiving second user preferences for operation of each of the multiple communications systems for when a second user is in the physical location with respect to each of the multiple communications systems;

establishing an hierarchical relationship between the first user and the second user that is utilized for resolving conflicts between the first user preferences and second user preferences such that the first user preferences take precedence over the second user preferences;

receiving presence information for the first user and the second user of the multiple communications systems, the presence information indicating the first user and the second user is in the physical location with respect to at least one of the multiple communications systems;

determining whether the first user preferences conflict operationally with the second user preferences for the at least one of the multiple communications systems; and if the first user preferences conflict with the second user preferences for the at least one of the multiple communications systems, resolving conflicts such that the first user preferences take precedence over the second user preferences:

passing the presence information for the first user of the multiple communications systems to the at least one of the multiple communications systems to indicate the first user is in the physical location with respect to the at least one of the multiple communications systems; and in response to receiving the presence information for the first user of the multiple communications systems at the at least one of the multiple communications systems, changing one or more settings of one or more of the other multiple communications systems for receiving a second communication for the second user based on the indication that the first user is in the physical location with respect to the at least one of the multiple communications systems.

21. The method of claim 20, wherein signaling to the one or more of the other multiple communications systems from a service provisioning system responsible for providing a communications service to the one or more of the other multiple communications systems is in response to receiving the presence information for the first user of the multiple communications systems at the service provisioning system responsible for providing a communications service to the one or more of the other multiple communications systems.

* * * * *